United States Patent Office 3,501,532
Patented Mar. 17, 1970

3,501,532
PROCESS FOR PREPARING AROMATIC SULFONES
John T. Minor, Ponca City, Okla., and George C. Feighner, Franklin Lakes, N.J., assignors to Continental Oil Company, Ponca City, Okla., a corporation of Delaware
No Drawing. Filed Sept. 5, 1967, Ser. No. 665,294
Int. Cl. C07c 147/06
U.S. Cl. 260—607                              8 Claims

ABSTRACT OF THE DISCLOSURE

Aromatic sulfones of the general formula $ArSO_2Ar'$ wherein Ar and Ar' represent like or unlike aromatic residues devoid of substituents or having reactively inert substituents are prepared by reacting an aromatic sulfonic acid with an aromatic compound having a replaceable hydrogen atom in the presence of a polyphosphoric acid.

BACKGROUND OF THE INVENTION

Field of the invention

This invention relates to a process for the preparation of aromatic sulfones wherein a mono-sulfonic acid derivative of an aromatic compound is condensed with a like or different aromatic compound to provide the sulfone.

Description of the prior art

The increased interest of late in aromatic sulfones as polymer additives and as intermediates for the preparation of polymers as well as other derivative products has prompted renewed investigation of the various methods available for the preparation of such sulfones.

Apart from processes in which sulfones are obtained in small amounts as by-products, e.g., in the sulfonation of aromatic compounds, only two synthesis methods appear interesting from a commercial standpoint. Of the latter, the hitherto preferred method involves reacting an aromatic sulfochloride with an aromatic compound in the presence of a Friedel-Crafts catalysts. The principal disadvantage of this mode of synthesis lies in the difficulty of preparing and isolating the aromatic sulfochloride. Other adverse factors include the corrosive nature of the reactants and disposal problems attendant upon the hydrogen chloride generation occurring in the reaction.

The other promising commercial method, and of which the present invention represents a variant, consists of reacting an aromatic sulfonic acid with an aromatic compound in the presence of a condensing agent. The drawbacks of the foregoing method reside in the dearth of suitable condensing agents and the processing problems arising from the use of those known to be reasonably effective for this purpose.

SUMMARY OF THE INVENTION

In accordance with this invention aromatic sulfones are prepared by condensing an aromatic sulfonic acid with an aromatic compound having a replaceable hydrogen attached to a nuclear carbon atom, preferably an aromatic hydrocarbon, in the presence of a polyphosphoric acid having a phosphoric anhydride content of from about 75 to 85 percent.

Our novel process is applicable for preparing asymetric as well as symmetrical sulfones. From the standpoint of yields, the present invention represents a decided improvement over analogous condensation practices of the prior art, especially in those instances where the sulfonic acid derivative is a higher alkaryl sulfonic acid. The process is likewise substantially devoid of the processing difficulties encountered when using the more effective condensing agents of the prior art, particularly representative of which is phosphoric anhydride, a material which is extremely hydroscopic and thus prone to coalesce into a gummy mass.

DESCRIPTION OF THE PREFERRED EMBODIMENTS

The underlying condensation reaction of the process of this invention is enhanced by carrying out the reaction under elevated temperature conditions, although the condensing agent, specifically the polyphosphoric acid, is the prime driving force of the reaction. Accordingly, optimum reaction rates are realized by using as high a temperature as possible consistent with the stability properties of the reactants and the resultant product. Maximum temperatures that can be used, therefore, are dependent upon the nature of the reactants. A suitable operable temperature range is generally from about 140° C. to 170° C.

The preferred manner of carrying out the condensation reaction consists of operating under reflux conditions. Applicable reflux temperatures obviously depend in a large measure on the specific organic compound reacted with the sulfonic acid. In those instances where the normal reflux temperature prevailing for a given reaction system is higher than that desired, a lower boiling inert solvent can be advantageously added for the purpose of controlling the maximum temperature.

The applicable sulfonic acids include for the most part the monosulfonated derivatives of benzene, indane tetrahydronaphthalene, naphthalene and the alkyl substituted forms thereof. These sulfonic acids can be readily obtained by the conventional sulfonation procedures involving the use of either concentrated sulfuric acid, oleum or sulfur trioxide as the sulfonating agent. The art is replete on suitable methods for accomplishing the monosulfonation of aromatic compounds of the type referred to above. It might be worthwhile to mention in this connection that in such sulfonation processes the sulfo group attaches to the aromatic nucleus of the compound subjected to sulfonation, and the precise position is governed by the various directing substituents that might be present.

It is also possible in accordance with this invention to achieve sulfonation of the aromatic compound and the formation of the sulfone in a one-step operation. The disadvantage of this mode of procedure is that it is limited to the production of symmetrical sulfones; or in such instances where the organic compound subjected to concurrent sulfonation and sulfone formation is a mixture of aromatic compounds, the product make-up will be heterogeneous in nature and generally difficult if not impractical to resolve into the individual product components.

While the aromatic sulfonic acids useful for the present purposes are preferably such derivatives of aromatic hydrocarbons, it is nevertheless contemplated that the aromatic sulfonic acid can carry inert substituents, as for instance, a halogen substituent. Likewise, the aromatic compound to be condensed with the sulfonic acid is preferably an aromatic hydrocarbon, although this reactant may also carry substituents which are inert with respect to the condensation reaction. Reactants containing functional groups, such as hydroxyl groups and the like, are to be avoided because such compounds are prone to give rise to the formation of undesirable by-products.

As indicated hereinbefore, it is desirable to have present in the reaction mixture at least a stoichiometric amount of the aromatic compound in relation of the amount of sulfonic acid present. More preferably, an excess of the aromatic component is used. Generally, a molar ratio of the sulfonic acid to the aromatic compound in the order of about 3 represents the upper practical limit.

In the preparation of asymetric sulfones in accordance with this invention, where such sulfones are of the type ArSO$_2$Ar′ wherein Ar is a higher alkyl phenyl grouping and Ar′ represents a phenyl or a lower alkyl phenyl grouping, it is preferred to derive the higher alkyl phenyl portion of the sulfone from the sulfonic acid derivative thereof as contarsted with reacting the higher alkyl phenyl portion in the form of the organic compound. In contemplation of this invention the terms "higher" and "lower" alkyl have the same meaning as the art customarily implies; namely, a lower alkyl contains up to about six carbon atoms, and higher alkyl connotes alkyl groups containing more than the stated amount of carbon atoms.

A grade of polyphospheric acid useful in the practice of our invention is available as a commercial product and has a P$_2$O$_5$ content of about 83 percent. Alternatively, the polyphospheric acids contemplated herein can be conveniently prepared by adding phosphorus anhydride to either 100 percent phosphoric acid (72 percent P$_2$O$_5$) or aqueous phosphoric acid. As mentioned hereinabove, suitable forms of the polyphosphoric acid are those having a P$_2$O$_5$ content of from about 75 to 85 percent and more preferably, from 80 to 85 percent. A polyphosphoric acid having a P$_2$O$_5$ content in excess of 85 percent is not necessary to achieve the objectives of the invention and when containing such a high amount of phosphoric anhydride are too viscous and present processing difficulties. It is possible, however, to employ polyphosphoric acid in such concentrated forms in combination with concentrated sulfuric acid, especially in the embodiment wherein sulfonation and sulfone formation is effected concurrently.

An applicable amount of the polyphosphoric acid condensing agent is primarily dependent upon the equivalents of sulfonic acid present in the reaction mixture and the P$_2$O$_5$ content of the condensing agent employed. Thus, a suitable basis for determining a satisfactory amount is such whereby the theoretical condensation water would result in the reduction of the P$_2$O$_5$ content of polyphosphoric acid present in the reaction system to about 75 percent. Obviously, in the embodiment wherein sulfonation accomplished in situ, the water generated in the sulfonation reaction is to be taken in account in ascertaining the above-mentioned dilution factor.

To illustrate to those skilled in the art the best mode by which the present invention can be carried out, the following specific working examples are provided. As indicated these examples are given primarily for the purposes of illustration, and accordingly, any enumeration of details set forth therein should not be interpreted as constituting a limitation on the invention. All parts are parts by weight unless otherwise indicated.

EXAMPLE I

Dixylyl sulfone was prepared in the following manner.

Into a suitable reaction vessel equipped with a stirrer, thermometer and reflux condenser having a water trap were charged 318 parts of xylene and 150 parts of 96 percent sulfuric acid. The charge was raised to reflux temperature with stirring and held until 30 parts of water were collected.

To the above mixture of xylene sulfonic acid and xylene were added 106 parts of xylene and 456 parts of polyphoric acid prepared by adding 283 parts of P$_2$O$_5$ to 173 parts of 85 percent phosphoric acid. The reaction mixture was refluxed for an additional 3½ hours.

The condensation reaction mixture was then added to 2000 parts water. The recovered aqueous phase was re-extracted with hot xylene and the combined extracts washed with dilute caustic and water. Distillation of the xylene left 365 parts (1.33 moles or 90 percent yield) of straw-colored dixylyl sulfone.

EXAMPLE II

Octylphenyl xylyl sulfone was prepared in the following manner.

To a reaction vessel equipped as in Example I were charged 270 parts (1.0 mole) of octylbenzene sulfonic acid, 350 parts of xylene and 560 parts of polyphosphoric acid having a P$_2$O$_5$ content of 79.5 percent. The reaction mixture was held at reflux with stirring for six hours. The mixture was then diluted with 2900 parts of a 20 percent (volumetric) isopropanol-water solution, the aqueous layer was removed and re-extracted with hot xylene and the combined xylene solutions were then washed with dilute caustic and water. The xylene was removed by distillation to leave 123 parts (0.34 mole or 34 percent yield from sulfonic acid) of yellow oil. The oil was distilled at 200° C. and 1 mm. pressure to give octylphenyl xylyl sulfone.

EXAMPLE III

This example primarily illustrates a method for preparing dixylyl sulfone wherein the requisite xylene sulfonic acid is formed in situ. The example also shows the limited degree of sulfone formation occurring in the conventional sulfonation reaction and thus serves to illustrate, specifically in Run E, the effectiveness of using a polyphosphoric acid condensing agent in accordance with this invention.

The runs outlined below in Table I were conducted in an apparatus set-up such as employed in the previous examples. In runs E and F a polyphosphoric acid having a P$_2$O$_5$ content of 83 percent was employed. The amounts thereof were 310 and 160 parts per mole of sulfonating agent, respectively. The reaction temperature was held at reflux. Total reaction time was about 4 hours. Other pertinent data for the respective runs are given in the table.

TABLE I.—PREPARATION OF DIXYLYL SULFONE

| Run | Sulfonating agent | Mole ratio xylene/ sulfonating agent | Condensing agent | Sulfone yield, percent |
|-----|-------------------|--------------------------------------|------------------|------------------------|
| A   | 96% H$_2$SO$_4$   | 2-1                                  |                  | 0.29                   |
| B   | 96% H$_2$SO$_4$   | 1-1                                  |                  | 5.2                    |
| C   | SO$_3$            | 2-1                                  |                  | 5.4                    |
| D   | 32% oleum         | 2-1                                  |                  | 1.5                    |
| E   | 96% H$_2$SO$_4$   | 2-1                                  | Polyphosphoric acid (83% P$_2$O$_5$). | 90 |
| F   | 96% H$_2$SO$_4$   | 2-1                                  | do               | 39                     |

What is claimed is:

1. A process for preparing an aromatic sulfone which comprises condensing an aryl sulfonic acid with at least a stoichiometric amount of an aromatic compound having a replaceable hydrogen atom at a temperature between about 140 and 170° C. in the presence of a polyphosphoric acid having a P$_2$O$_5$ content of from about 75 to 85 percent.

2. A process in accordance with claim 1 wherein the polyphosphoric acid has a P$_2$O$_5$ content of from about 80 to 85 percent.

3. A process in accordance with claim 2 wherein said aromatic compound is a lower alkyl- or dialkylbenzene.

4. A process in accordance with claim 3 wherein the aryl sulfonic acid is a higher alkylbenzene sulfonic acid.

5. A process in accordance with claim 3 wherein the aryl sulfonic acid is a lower alkyl- or dialkylbenzene sulfonic acid.

6. A process in accordance with claim 4 wherein the aromatic compound is toluene, xylene, or mixtures thereof.

7. A process in accordance with claim 5 wherein the aromatic compound is toluene, xylene, or mixture thereof.

8. A process in accordance with claim 7 wherein the aryl sulfonic acid is xylene sulfonic acid, toluene sulfonic acid, or mixtures thereof.

References Cited

UNITED STATES PATENTS 3,125,604   3/1964   Robbins _____ 260—607

CHARLES B. PARKER, Primary Examiner

D. R. PHILLIPS, Assistant Examiner